(12) United States Patent
Gedliczka et al.

(10) Patent No.: US 11,163,892 B2
(45) Date of Patent: Nov. 2, 2021

(54) BUFFERING DATA UNTIL ENCRYPTED DESTINATION IS UNLOCKED

(71) Applicant: INTERNATIONAL BUSINESS MACHINES CORPORATION, Armonk, NY (US)

(72) Inventors: Tymoteusz Gedliczka, Cracow (PL); Szymon M. Brandys, Cracow (PL); Piotr Grzywna, Cracow (PL); Tomasz Kania, Tarnow (PL); Maciej F. Madej, Cracow (PL); Krzysztof B. Pitula, Tarnow (PL)

(73) Assignee: International Business Machines Corporation, Armonk, NY (US)

(*) Notice: Subject to any disclaimer, the term of this patent is extended or adjusted under 35 U.S.C. 154(b) by 304 days.

(21) Appl. No.: 16/243,369

(22) Filed: Jan. 9, 2019

(65) Prior Publication Data
US 2020/0218813 A1 Jul. 9, 2020

(51) Int. Cl.
*G06F 21/60* (2013.01)
*H04L 9/08* (2006.01)

(52) U.S. Cl.
CPC .......... *G06F 21/602* (2013.01); *H04L 9/0825* (2013.01); *H04L 9/0861* (2013.01)

(58) Field of Classification Search
CPC .... G06F 21/602; H04L 9/0825; H04L 9/0861
USPC ........................................................ 713/193
See application file for complete search history.

(56) References Cited

U.S. PATENT DOCUMENTS

| | | | | |
|---|---|---|---|---|
| 4,400,773 A * | 8/1983 | Brown | ................... | G06F 13/126 710/19 |
| 4,663,709 A * | 5/1987 | Fujiwara | ................... | G06F 9/52 710/267 |
| 5,539,827 A * | 7/1996 | Liu | ........................ | H04L 9/0618 380/28 |
| 5,594,869 A * | 1/1997 | Hawe | ....................... | H04L 29/06 370/474 |
| 5,999,930 A * | 12/1999 | Wolff | ......................... | G06F 9/52 |
| 6,272,662 B1 * | 8/2001 | Jadav | ..................... | G06F 3/0607 714/770 |
| 6,336,187 B1 * | 1/2002 | Kern | ........................ | G06F 21/10 713/161 |
| 8,352,750 B2 | 1/2013 | Haines et al. | | |
| 8,364,985 B1 | 1/2013 | Subramanian et al. | | |
| 9,727,490 B2 * | 8/2017 | Johnson | .................. | G06F 12/14 |
| 9,740,639 B2 | 8/2017 | Basmov et al. | | |
| 2002/0019935 A1 * | 2/2002 | Andrew | ................. | H04L 9/0897 713/165 |
| 2003/0051135 A1 | 3/2003 | Gill et al. | | |
| 2003/0097580 A1 * | 5/2003 | Chang | ..................... | G06F 21/85 713/194 |

(Continued)

OTHER PUBLICATIONS

NPL Search Terms (Year: 2021).*

(Continued)

*Primary Examiner* — Syed A Zaidi
(74) *Attorney, Agent, or Firm* — Dmitry Paskalov (57) ABSTRACT

A computer-implemented method for loading data into a secure storage volume may be provided. The method comprises receiving data to be stored on the secure storage volume, storing the received data in a buffer, and upon determining that the secure storage volume is unlocked, transferring the received data from the buffer to the secure storage volume in encrypted form.

13 Claims, 6 Drawing Sheets

(56) References Cited

U.S. PATENT DOCUMENTS

| | | | | |
|---|---|---|---|---|
| 2008/0320319 | A1* | 12/2008 | Muller | G06F 21/6272 713/193 |
| 2010/0037048 | A1* | 2/2010 | Madan | G06F 9/544 713/165 |
| 2010/0199042 | A1* | 8/2010 | Bates | H04L 9/0891 711/114 |
| 2013/0024638 | A1* | 1/2013 | Russo | G06F 21/31 711/163 |
| 2015/0286412 | A1 | 10/2015 | Bennion | |

OTHER PUBLICATIONS

Cisco Systems Inc., "How to Use the Enable Data Encryption Feature on the Cisco Smart Storage", How to Encrypt Data, 9 pages, accessed Nov. 12, 2018.

Hoffman, "What's the Difference Between BitLocker and EFS (Encrypting File System) on Windows?", How to Geek, Dec. 22, 2015, 6 pages, https://www.howtogeek.com/236719/whats-the-difference-between-bitlocker-and-efs-encrypting-file-system-on-windows/.

QNAP Systems Inc., "How do I encrypt the data on a QNAP NAS?", accessed on Jan. 30, 2018, 14 pages, https://www.qnap.com/en/how-to/tutorial/article/how-do-i-encrypt-the-data-on-a-qnap-nas.

QNAP Systems Inc., "TS-x31P" 4 pages, accessed on Nov. 12, 2018, http://files.qnap.com/news/pressresource/datasheet/TS-x31P_(EN)_51000-024215-RS_web.pdf.

Vp, "Protect Servers with 'Entire Drive Encryption' via BitLocker", Cybrary, Apr. 6, 2016, 19 pages, https://www.cybrary.it/0p3n/protect-server-entire-drive-encryption-via-bit-locker/.

Wikipedia, "Disk encryption hardware", https://en.wikipedia.org/wiki/Disk_encryption_hardware, 1 page, accessed Nov. 12, 2018.

Wikipedia, "Public-key cryptography" https://en.wikipedia.org/wiki/Public-key_cryptography, 15 pages, accessed on Nov. 12, 2018.

* cited by examiner

100 Method

102 Receiving data

104 Store the date in a buffer

106 Upon determining that the secure storage volume is unlocked,
transfer the received data from the buffer to the secure storage volume in encrypted form

BUFFERING DATA UNTIL ENCRYPTED DESTINATION IS UNLOCKED

BACKGROUND

The invention relates generally to a method for loading data into a secure storage volume, and more specifically, to a computer-implemented method for loading data into a secure storage volume which is locked and which may not have a direct user interface. The invention relates further to a related system for loading data into a secure storage volume, and a computer program product.

Storing large amounts of data continues to be a constant challenge not only for enterprises but also for SMB (small and medium business) and private computer users. Often, network attached storage (NAS) devices may be used to store data outside the actually used computer system. This may make data available to a group of users and may offload data not permanently required on, e.g., a mobile device. The data may then be accessed by authorized users—in particular those knowing the access credentials—via a network. A popular feature of NAS devices for home/small office solutions is a quick copy button. It allows attaching external storage—e.g., a disk or a memory card or a USB stick—to a port of the NAS device—typically a USB port or an SD slot—and copying its content to the predefined location of the NAS by just pressing a dedicated button on the NAS cover.

This may be very convenient, e.g., for copying photos from an SD card (secure digital memory card) without the requirement to use a computer as interfacing device.

Another popular option for such NAS devices is data encryption. Typically, NAS devices are headless—i.e., don't have any keyboard and/or a display—so users have to connect to the NAS device over a network from another computer to provide the required encryption password in order to unlock and access the volume. Another option may be that the password is stored in the NAS device, which makes it convenient—i.e., no need for manual action in case of reboot—but less secure. The individual disks of the NAS device may be encrypted, but in case of theft of the entire NAS, the data could be decrypted without a lot of effort.

Thus, users may have either convenience (one touch copy button) or security (encrypted volume, without any encryption key on the NAS device), but both options together—up to now—do not work at the same time. If it would be required to provide a password to unlock an encrypted volume, the one touch copy option may no longer be that convenient.

SUMMARY

According to one aspect of the present invention, a computer-implemented method for loading data into a secure storage volume may be provided. The method may comprise receiving data to be stored on the secure storage volume, storing the received data in a buffer, and upon determining that the secure storage volume is unlocked, transferring the received data from the buffer to the secure storage volume in encrypted form.

According to another aspect of the present invention, a related system for loading data into a secure storage volume may be provided. The system may comprise a secure storage volume adapted for storing data received by a receiving unit, a buffer adapted for intermediately storing the received data, a determination module adapted for determining that the secure storage volume is unlocked, and a transferring module adapted for: upon the determination by the determination module determining that the secure storage volume is unlocked, transferring the received data from the buffer to the secure storage volume in encrypted form.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'secure storage volume' may denote a device or a part of a device—eventually only file system comprising data files—enabled to store data in a secured form, e.g., in encrypted form. The secure storage volume may store data non-volatile and persistently, i.e., if power is down for the secure storage volume or a related device, the data continue to be validly stored. If power comes back, the data will be re-accessible. In order to access the data of the secure storage volume, an access key may be required. The access key may at the same time be the encryption/decryption key using a symmetric encryption/decryption method.

The term 'data' may denote any type of information storable in form of text, images, sound, video, executable programs, archives, database or any other suitable format for electronic data.

The term 'buffer' may denote an intermediate storage. The buffer may also be available in form of a storage volume and may optionally allow an encryption of the stored data. The buffer may be implemented as part of the same device the secure storage volume is implemented, e.g., a NAS (network attached storage) or another persistent storage. The physical storage may be implemented using a hard drive or a solid state disk (SSD), e.g., in form of an NVRAM, as memristor or any other device allowing to build persistent storage devices. The buffer may also be denotable as buffer device or staging buffer.

The term 'unlocked' may denote that access to secured, protected data is granted to a user or system. The user or a system operated by a user (or another system) may require a password. Also 2-way-authentication principles may be implementable. The password used to unlock the device operable for the secure storage volume may, at the same time, be the encryption/decryption password for accessing the data. Thus, a symmetrical encryption/decryption key may be used.

The term 'data in encrypted form' may denote that the data have been encrypted and may only be accessible after a decryption. In cryptography, encryption is the process of encoding a message or information in such a way that only authorized parties can access it and those who are not authorized cannot. Encryption does not itself prevent interference, but may deny the intelligible content to a would-be interceptor. In an encryption scheme, the intended information or message, referred to as plaintext, is encrypted using an encryption algorithm—a cipher—generating cipher text that may be read only if decrypted. For technical reasons, an encryption scheme may usually use a pseudo-random encryption key generated by an algorithm. It may in principle be possible to decrypt the message without possessing the key, but, for a well-designed encryption scheme, considerable computational resources and skills are required. An authorized recipient may easily decrypt the message with the key provided by the originator to recipients but not to unauthorized users.

The term 'encryption key' may denote a code to encode data in the sense of the previous paragraph.

The term 'ad-hoc generated encryption key' may denote, e.g., a pseudo-randomly generated encryption key, which may be generated "on the fly", i.e., whenever it is needed. Any code may be used, because for the proposed concept. The ad-hoc encryption key will never be used by a human operator or user.

The term 'asymmetric key pair' may denote any cryptographic system that uses pairs of keys: public keys which may typically be disseminated widely, and private keys which may be known only to the owner or authorized personnel (or systems). This may accomplish two functions: authentication, where the public key may verify that a holder of the paired private key sent the message, and encryption, where only the paired private key holder can decrypt the message encrypted with the public key; in the here proposed concept, this would be the intermediately stored received data in the buffer.

In a public key encryption system, any person or system may encrypt a message using the public key. That encrypted message may only be decrypted with the private key. To be practical, the generation of a public and private key-pair may be computationally economical. The strength of a public key cryptography system relies on the computational effort (work factor in cryptography) required to find the private key from its paired public key. Effective security only may require keeping the private key private (on the secure storage volume); the public key may be openly distributed without compromising security, here on the buffer or in another volatile storage of the related device.

The proposed computer-implemented method for loading data into a secure storage volume may offer multiple advantages and technical effects:

The proposed concept may enable conveniently importing data to an encrypted storage volume without significant degradation in security and performance. Even if the encrypted destination volume is locked, there is no need for a user to provide a password—in particular, the encryption/decryption key—or use any other authentication to import new data. The imported data may be stored on a staging device or staging volume outside of the destination encryption volume. When a user unlocks the encrypted secure volume, the data received may be flushed—after encryption—from the staging volume—in particular, the buffer—to the destination secure volume, e.g., a new subdirectory thereof.

Moreover, the application of the proposed concept is not limited to NAS devices, but may be applied to any other storage systems in mobile or other devices. Thus, the proposed concept combines the convenience of an easy data reception—e.g., via a one touch copy button—and the access security provided using encrypted volumes.

It may also be possible to encrypt also the received data on an intermediate volume/device—i.e., the buffer—and secure its content against unauthorized access and not only encrypt the data on the secure storage volume. Thus, no received data may ever be stored in clear text format. And the storage device comprising the secure storage volume and the buffer may remain headless, i.e., without a dedicated user interface comprising a keyboard and a screen or similar.

In the following, additional embodiment of the proposed method—also applicable to the related system—will be described:

According to one preferred embodiment of the method, the secure storage volume may be unlocked by a received encryption key—e.g., received from a user—to be used to encrypt and decrypt data on the secure storage volume. The secure storage volume may be a component of, e.g., a NAS without a direct user interface (eventually, only via a web browser via another computer). If a user intends to access data on the secure storage volume, he may enter the key—e.g., an encryption/decryption key for the data on the secure storage volume—and may send it to the system managing the secure storage volume. For accessing the data on the secure storage volume, the system may use the key received and unlock the secure storage volume. In such a case, the key may also be used to encrypt the data on the buffer before transferring them to the secure storage volume. After such a process step, the originally received data, intermediately stored on/in the buffer, may be stored in encrypted form in/on the secure storage volume with the same key as the data that have already been stored there before. Thus, after that process, the data are consequently accessible like any other data on/in the secure storage volume (i.e., using the secret decryption key).

According to an advantageous embodiment of the method, the received data in the buffer may be encrypted using an encryption key available to the buffer. Such an encryption key may be stored in the device of the secure storage volume. The key may be set up during a setup procedure of the device. During normal operation of the device, managing the secure storage volume, the data on/in the buffer may be secured against unauthorized access. However, if the complete device of the secure storage volume—e.g., a comparably small NAS box—may be stolen, the data on/in the buffer may still be not directly accessible using the key stored in the device. However, also this potential weakness may be address as explained below.

According to another advantageous embodiment of the method, the received data in the buffer may be encrypted using an ad-hoc generated encryption key. Hence, a new ad-hoc encryption key may be generated every time new data may be received after each press on the "one-click" storage button. However, it may also be possible to use the ad-hoc generated encryption key for several chunks of received data, e.g., for a predefined number of received chunks or for a predefined timeframe, etc. The ad-hoc generated encryption key for the data of the buffer may also be stored in the device; hence, also with this mechanism a stolen NAS may render the data stored in encrypted form in/on the buffer as compromised. Alternatively, the ad-hoc generated encryption key may be stored remotely to the device. In such a case, not only the data on the secure storage volume, but also the data on/in the buffer may be safe against unauthorized access.

According to an additional alternative embodiment of the method, the ad-hoc generated encryption key—e.g., denoted as KEY1—may be stored in an encrypted form using an asymmetric key pair—in particular, public key PUB/private key PRV—which public portion may be stored unencrypted in the buffer and which private key portion—in particular PRV—may be stored on the secure storage volume—in particular in an encrypted form requiring the unlocking key KEY0 for the secure storage volume to re-establish the ad-hoc generated encryption key, i.e., KEY1. The public key PUB may be stored in the device or as part of the buffer during set-up in clear text form.

This way, it may be required to unlock the secure storage volume with the unlocking key KEY0 in order to access the private key portion PRV for decrypting the key required to decrypt temporary stored received data of the buffer to further encrypt these received data with the unlocking and encryption key KEY0 of the secure storage volume before storing the data on/in the secure storage volume. This way, a theft of the device, housing the buffer and the secure storage volume, keeps the data in the secure storage volume, as well as in the buffer inaccessible for un-authorized personnel.

According to optional embodiments of the method, the secure storage volume may be a storage volume of a storage device selected from the group comprising a network attached storage (NAS), a digital camera, a smartphone, a digital voice recorder, a surveillance system or, any other suitable storage device, allowing to define and to set up storage volumes. Optionally, such a storage device may also be operated by a cloud computing provider and may only be accessible via a wide area network.

According to one advantageous embodiment of the method, the buffer may also be a volume, and the buffer volume and the secure storage volume may be stored on a hard drive—or a group of hard drives—of a storage system. Furthermore, the buffer and the secure storage volume may also be arranged on a non-hard-drive device. Thus, the device may be realized using spinning disks and/or solid state devices/drives.

According to one preferred embodiment of the method, the received data in a buffer may be removed—in particular, automatically deleted—after the data from the buffer may have been transferred to the secure storage volume—in particular, in encrypted form. Thus, data may only be stored potentially in unencrypted form—in particular, in/on the buffer—as long as needed.

According to a further preferred embodiment of the method, the secure storage volume may be locked after the data from the buffer have been transformed to the secure storage. Such a locking of the secure storage volume may happen automatically if there is no continued authorized access to the data in/on the secure storage volume after finishing the transfer from the buffer to the secure storage volume. Thus, the access to the secure storage volume is only as long as required "open" as necessary.

In the following, a detailed description of the figures will be given. All instructions in the figures are schematic. Firstly, a block diagram of an embodiment of the inventive computer-implemented method for loading data into a secure storage volume is given. Afterwards, further embodiments, as well as embodiments of the system for loading data into a secure storage volume, will be described.

Figure 1:
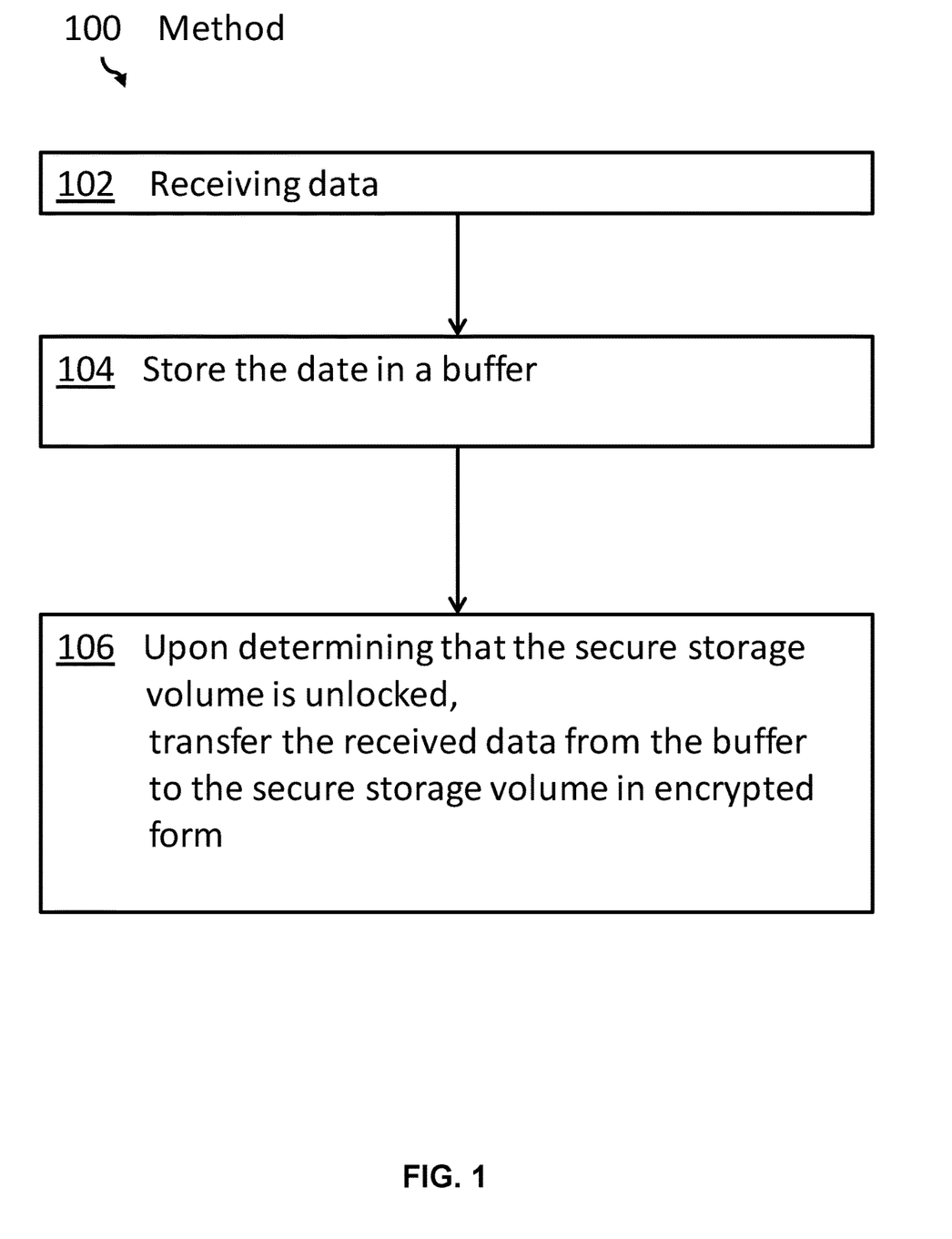
FIG. 1 shows a block diagram of an embodiment of the inventive computer-implemented method for loading data into a secure storage volume.

FIG. 1 shows a block diagram of an embodiment of the computer-implemented method 100 for loading data into a secure storage volume—in particular an encrypted secure storage volume. The method 100 comprises receiving, 102, data—e.g., from an USB stick or SD card—to be stored on the secure storage volume, e.g., in a NAS using a one touch button feature.

The method 100 also comprises storing, 104, the received data in a buffer, and upon determining that the secure storage volume becomes unlocked—e.g., by providing a password/the encryption key (KEY0)—transferring, 106, the received data from the buffer to the secure storage volume in encrypted form, in particular using the encryption key KEY0 to safely store the received data on the secure storage device. The determining the unlocked status of the secure storage volume may be implemented by checking the status in a loop process, by messaging technology or by using an interrupt.

I should also be mentioned that instead of the NAS a camera with a smart card may support the proposed concept. In such a case, the buffer would, e.g., be a part of the camera's memory and the smart card (SD=secure digital) memory card—usually used to store the images—is used as the secure storage device.

Alternatively, the same principle may be applied to a smartphone with, e.g., an SD card. E.g., the smartphone memory (i.e., part of it) may function as buffer and the smartcard may be instrumental as secure storage device. A user interface may be useful for entering the key KEY0 for the encryption of the data (e.g., images or other received data) and for triggering the transfer for the buffer to the secure storage device.

Figure 2:
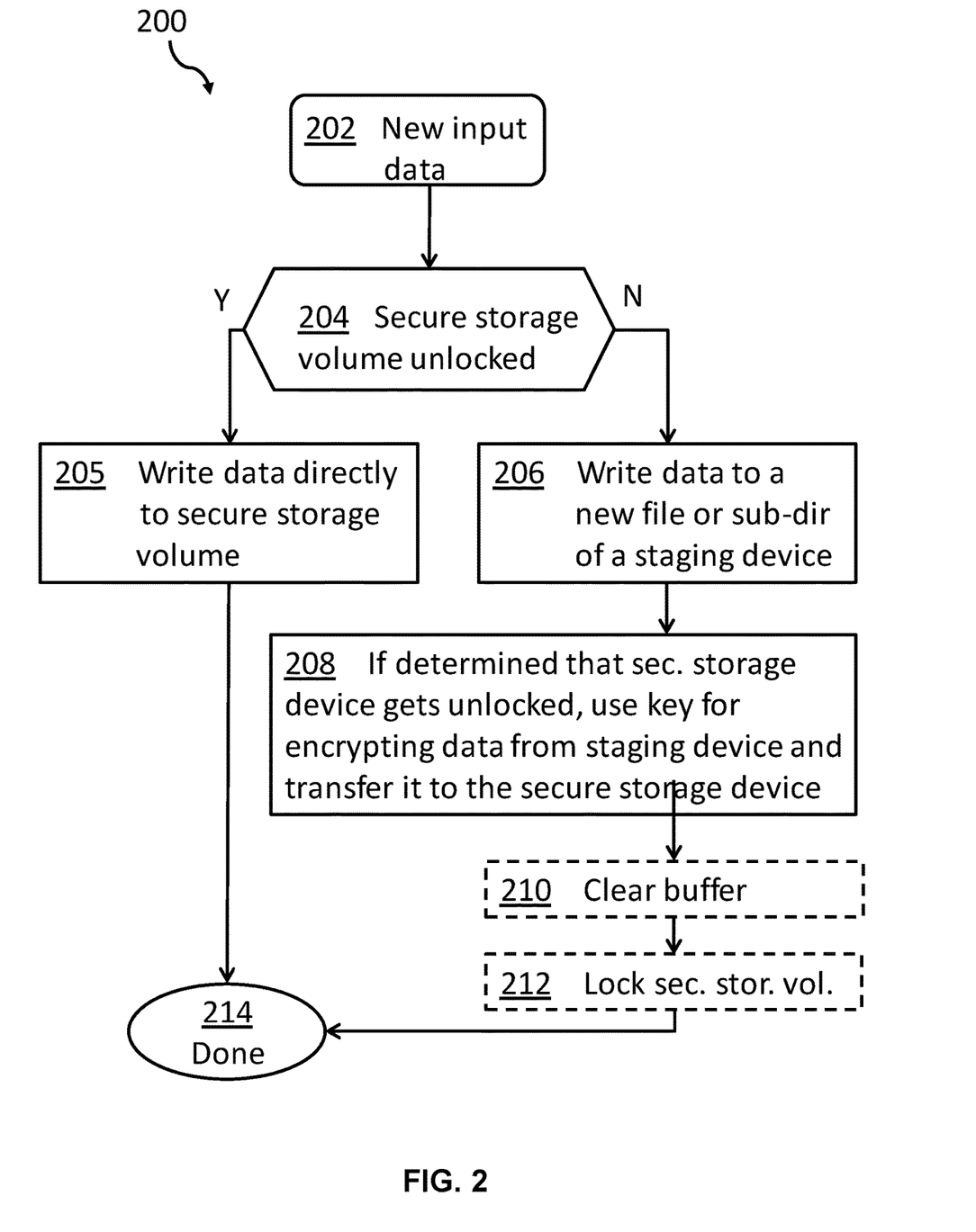
FIG. 2 shows a block diagram of a more implementation-near embodiment of the proposed concept.

FIG. 2 shows a block diagram of a more implementation-near embodiment 200 of the proposed concept. New data 202 may become available to be stored securely. Firstly, it is determined, 204, whether the secure storage volume is unlocked. If that is the case—case "Y"—the data are written 205 to the secure storage volume in encrypted form. If that is not the case—case "N"—the received data are firstly saved, 206, to a file (or more files) or sub-directory of a staging device, i.e., a buffer. In case it is determined that the secure storage volume has been unlocked—e.g., the encryption/access key (e.g., KEY0) has been received—the data in the buffer will automatically be transferred, 208 to the secure storage volume—in particular after encryption with the encryption key of the secure storage volume KEY0.

Optionally, the buffer can be cleared, 210, after the transferring the data and the secure storage volume can also be locked 212, automatically—if no further access to the secure storage volume may be required—after the transfer is complete. The process ends in both cases at 214.

Figure 3:
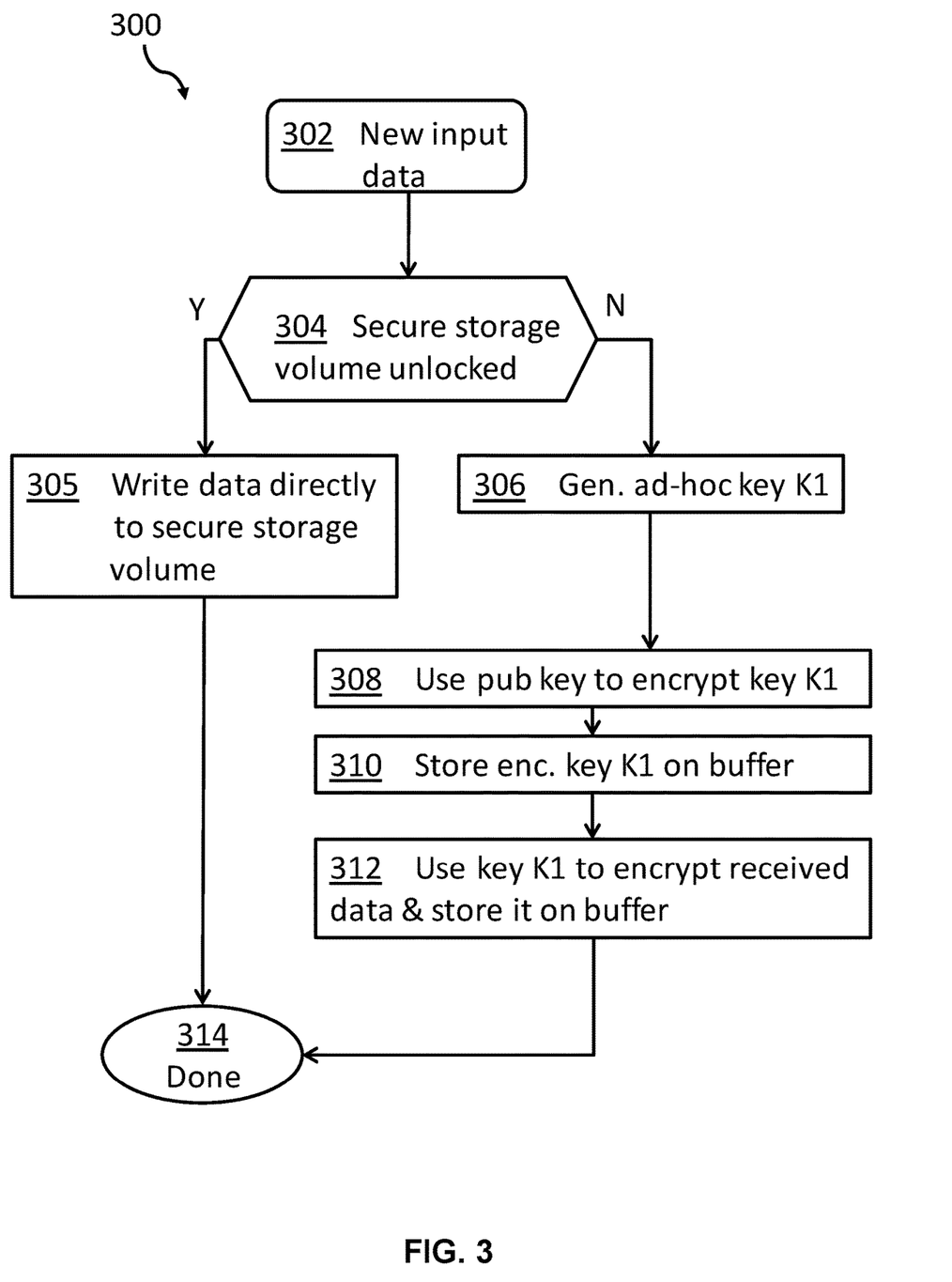
FIG. 3 shows a block diagram of another implementation-near embodiment of the proposed concept.

FIG. 3 shows a block diagram of another implementation-near embodiment of an embodiment 300 of a part of the proposed concept. Again, as in FIG. 2, new input data are received, 302. Then, it is be determined, 304, whether the secure storage volume is unlocked. If that is the case—case "Y"—the data are directly written, 305, to the secure storage volume in encrypted form (using key KEY0).

If that is not the case—case "N"—an ad-hoc key K1 is generated, 306 (if it has not been generated before). This key K1 is then encrypted, 308, using a public portion PUB of a public/private key pair PUB/PRV. The key portion PUB may be available unencrypted, e.g., stored in the buffer or in another non-volatile memory of the related device. The private portion PRV may be stored in the secure storage device in encrypted form. Thus, data stored in encrypted form with key K1 may not be decrypted without having access to the encrypted key portion PRV as part of the secure storage volume which can only be unlocked by the access key KEY0.

Thus, the key KEY0—i.e., the access key to the secure storage volume—needs to be available to access the data on the buffer by decrypting the key K1 and by using K1 to decrypt the data on/in the buffer.

In any case, the encrypted key K1 and the key PUB are finally stored, 310, on the buffer. The key K1 (in unencrypted form) is also used to encrypt, 312, the received data for storing it on the buffer. In both cases, the sub-process ends at 314.

Figure 4:
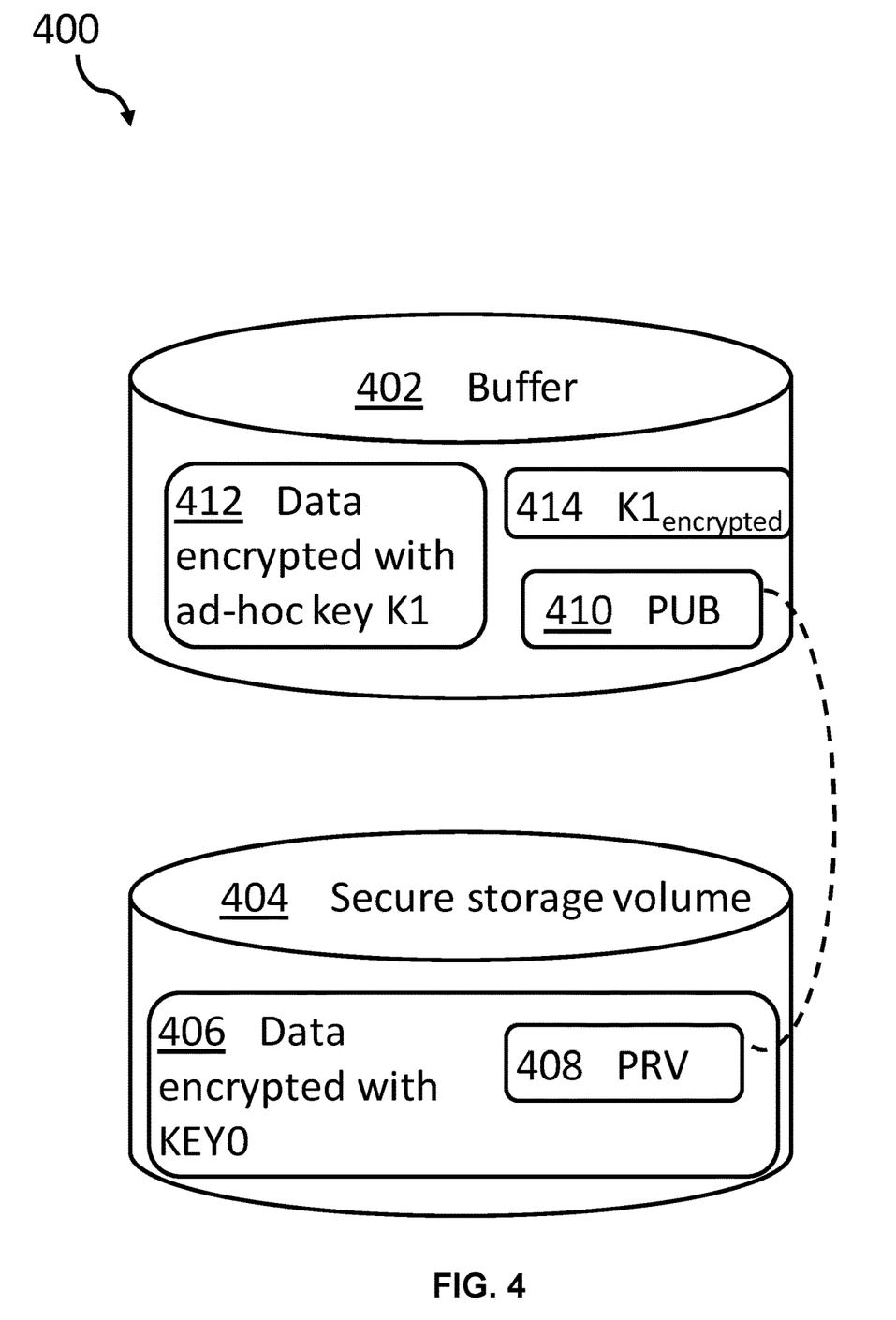
FIG. 4 shows an embodiment of volumes with keys.

The transfer from the buffer 402 to the secure storage volume 404 is performed according to FIG. 2, with the additional step of decrypting K1, and with it—in encrypted form—to decrypt the data on/in the buffer. Then, the data are encrypted with the key KEY0 (ref.-num. 406) and stored on the secure storage volume 404.

A practical example may render the proposed concept more comprehensive:
1. A user buys a NAS with the invention implemented.
2. The user executes initialization/setup of the device. He chooses a key/passphrase "KEY0" for encrypting the encrypted volume. Also, a pair of asymmetrical keys is generated. The public key "PUB" is saved on staging volume and private key "PRV" is saved on the encrypted volume.
    The staging volume/buffer comprises: PUB.
    The secure storage volume (unlocked) contains: PRV.
3. The user locks the encrypted volume.
    The buffer comprises: PUB.
    The secure storage volume (locked) comprises: PRV.
4. The user uploads file DATA1 to the NAS. A random symmetrical key "KEY1" is generated. The file DATA1 is encrypted using key KEY1 and is stored as ENC_DATA1 on the buffer (also denotable as buffer volume). Key KEY1 is encrypted using key PUB and is stored as ENC_KEY1 in the buffer (also denotable as staging volume).
    The buffer comprises: PUB, ENC_DATA1, ENC_KEY;
    The secure storage volume (locked) comprises: PRV.
5. The user uploads file DATA2 to the NAS. A random symmetrical key "KEY2" is generated. File DATA2 is encrypted using key KEY2 and is stored as ENC_DATA2 on the buffer. Key KEY2 is encrypted using key PUB and is stored as ENC_KEY2 on the buffer.
    The buffer comprises: PUB, ENC_DATA1, ENC_KEY1, ENC_DATA2, ENC_KEY2;
    The secure storage volume (locked) comprises: PRV.
6. The user unlocks the secure storage volume using KEY0 (typically, remembered by a user).
    The buffer comprises: PUB, ENC_DATA1, ENC_KEY1, ENC_DATA2, ENC_KEY2;
    The secure storage volume (unlocked) comprises: PRV.
7. The user flushes/transfers the data to the secure storage volume.
    7.1. PRV key is used to decrypt ENC_KEY1 into plain KEY1. KEY1 key is used to decrypt ENC_DATA1 into plain DATA1. DATA1 gets stored on the secure storage volume. ENC_KEY1 and ENC_DATA1 are removed.
    7.2 PRV key is used to decrypt ENC_KEY2 into plain KEY2. KEY2 key is used to decrypt ENC_DATA2 into plain DATA2. DATA2 gets stored on the encrypted volume. ENC_KEY2 and ENC_DATA2 are removed.
    The buffer comprises: PUB.
    The secure storage volume (unlocked) comprises: PRV, DATA1, DATA2.

FIG. 4 shows an embodiment 400 of volumes with keys. The buffer volume 402, as well as the secure storage volume 404 may be stored on/in a storage system—e.g., a hard drive or a solid-state disk, or comparable. However, it may also be possible to use more than one storage device—e.g., as part of the same NAS—to manage the buffer 402 and the secure storage volume 404.

The public/private key pair PUB/PRV 408/410 relate to each other as shown. The key PUB 410 may also be stored in other components of a related device. The key KEY0 is required to access the data encrypted on the secure storage volume 404. Additionally, the same key may be required to decrypt the key portion PRV 408 in order to decrypt K1 to be used for the decryption the data 412 which have been encrypted in the buffer using the ad-hoc key K1, before the data are encrypted using the key KEY0 and stored on/in the secure storage volume 404.

Figure 5:
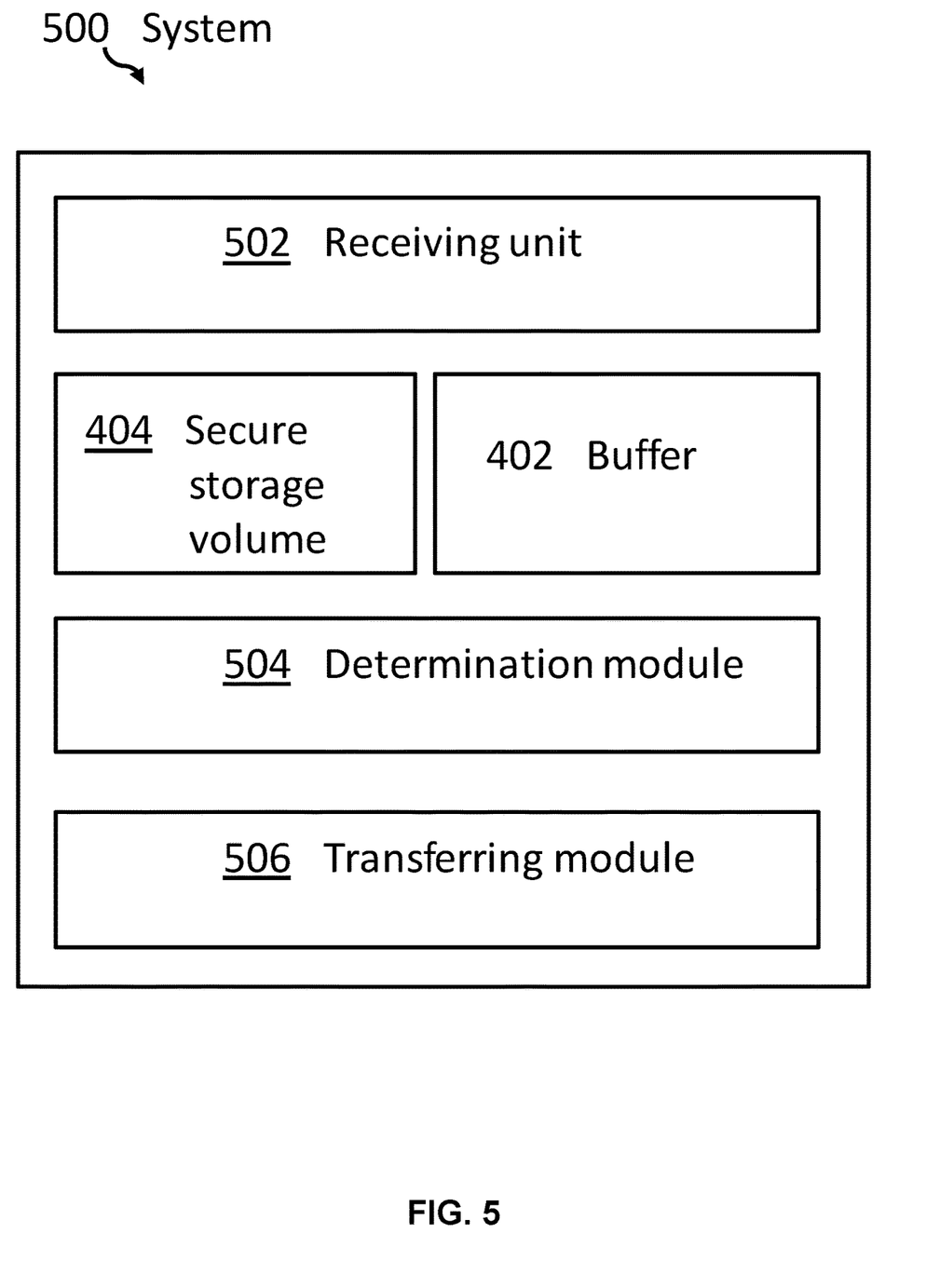
FIG. 5 shows a block diagram of an embodiment of the system for loading data into a secure storage volume.

FIG. 5 shows a block diagram of an embodiment of the system 500 for loading data into a secure storage volume 404 (compare FIG. 4). The system comprises the secure storage volume 404 adapted for storing data received by a receiving unit 502, a buffer 402 adapted for intermediately storing the received data, a determination module 504 adapted for determining that the secure storage volume is unlocked, and a transferring module 506 adapted for: upon the determination by the determination module determining that the secure storage volume 404 is unlocked, transferring the received data from the buffer to the secure storage volume 404 in encrypted form.

Figure 6:
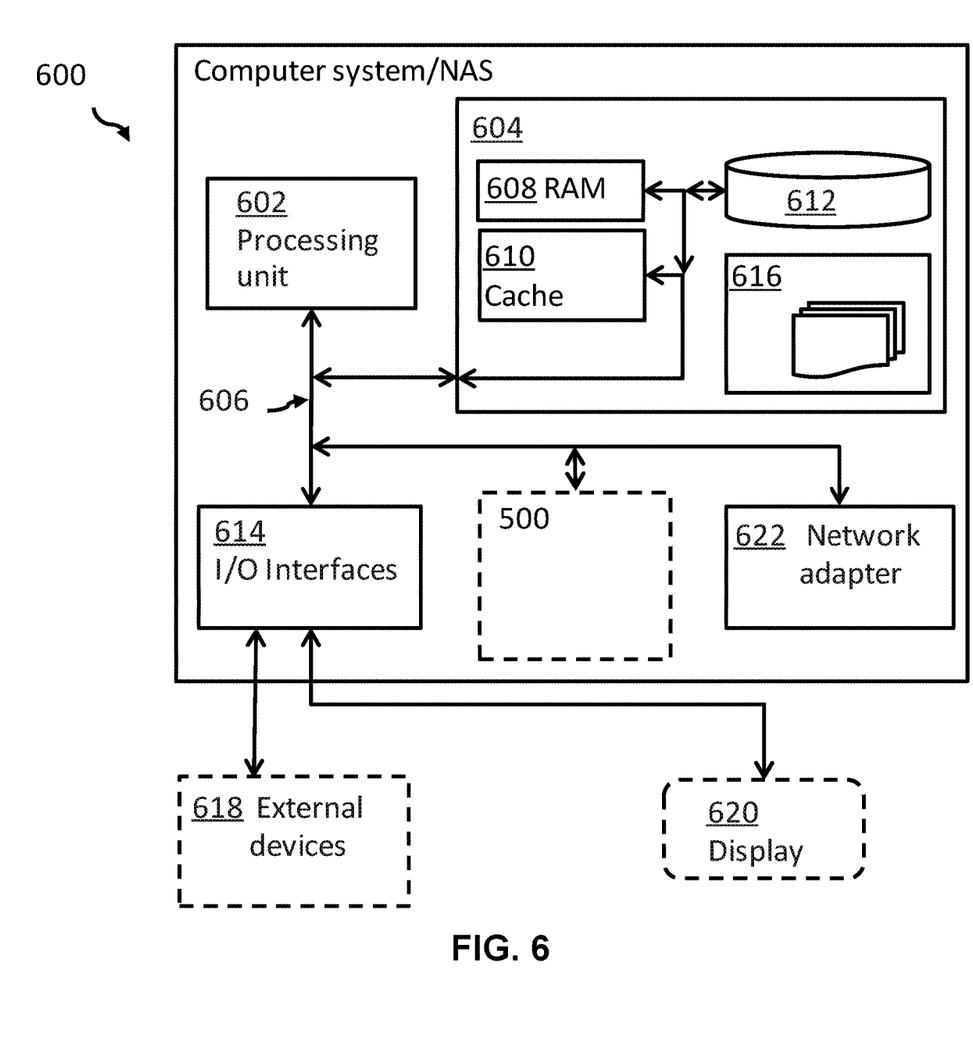
FIG. 6 shows an embodiment of a computing system comprising the system according to FIG. 5.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that, although not shown, other hardware and/or software components could be used in conjunction with computer system/server 600. Examples include, but are not limited to: microcode, device drivers, redundant processing units, external disk drive arrays, RAID systems, tape drives, and data archival storage systems, etc.

It may be noted that the computing system in the context of the proposed idea for the logging system may be headless, meaning that only network connections may be available, but no display, pointing device, or other direct user I/O components. Additionally, the system 500 for loading data into a secure storage volume may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for loading data into a secure storage volume, said method comprising:
    receiving data to be stored on said secure storage volume when said secure storage volume is locked;
    storing said received data in a buffer, wherein said buffer is a staging volume outside of said secured storage volume;
    based on receiving a key to unlock said secure storage volume,
        encrypting said received data in said buffer with an ad-hoc generated encryption key;
        unlocking said secure storage volume with said received key; and
    upon determining that said secure storage volume is unlocked using an interrupt, transferring said received data from said buffer to said secure storage volume in encrypted form.

2. The method according to claim 1, wherein said ad-hoc generated encryption key is stored in an encrypted form using an asymmetric key pair which public portion is stored unencrypted in said buffer and which private key portion is stored on said secure storage volume.

3. The method according to claim 1, wherein said secure storage volume is a storage volume of a storage device selected from a group comprising a network attached storage, a digital camera, a smartphone, a digital voice recorder, a surveillance system.

4. The method according to claim 1, wherein said buffer is a volume and wherein said buffer and said secure storage volume are stored on a hard drive of a storage system.

5. The method according to claim 1, wherein received data in a buffer are removed after said data from said buffer are transferred to said secure storage volume.

6. The method according to claim 1, wherein said secure storage volume is locked after said data from said buffer have been transformed to said secure storage.

7. A computer system for loading data into a secure storage volume, said computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        receiving data to be stored on said secure storage volume when said secure storage volume is locked;
        storing said received data in a buffer, wherein said buffer is a staging volume outside of said secured storage volume;
        based on receiving a key to unlock said secure storage volume,
            encrypting said received data in said buffer with an ad-hoc generated encryption key;
            unlocking said secure storage volume with said received key; and
        upon determining that said secure storage volume is unlocked using an interrupt, transferring said received data from said buffer to said secure storage volume in encrypted form.

8. The computer system according to claim 7, further comprising: storing said ad-hoc generated encryption key in an encrypted form using an asymmetric key pair which public portion is stored unencrypted in said buffer and which private key portion is stored on said secure storage volume.

9. The computer system according to claim 7, wherein said secure storage volume is a storage volume of a storage device from a group comprising at least one out of said group a network attached storage, a digital camera, a smartphone, a digital voice recorder, a surveillance system.

10. The computer system according to claim 7, wherein said buffer is a volume and wherein the buffer and said secure storage volume are stored on a hard drive of a storage system.

11. The computer system according to claim 7, wherein said buffer is also adapted for removing said received data from said buffer after transferring said received data to said secure storage volume.

12. The computer system according to claim 7, wherein said secure storage volume is adapted to be lockable after said data from said buffer have been transformed to said secure storage.

13. A computer program product for loading data into a secure storage volume, said computer program product comprising a computer readable storage medium having program instructions embodied therewith, said program instructions being executable by one or more computing systems or controllers to cause said one or more computing systems to:
    receive data to be stored on said secure storage volume when said secure storage volume is locked;
    store said received data in a buffer, wherein said buffer is a staging volume outside of said secured storage volume;
    based on receiving a key to unlock said secure storage volume,
        encrypt said received data in said buffer with an ad-hoc generated encryption key;
        unlock said secure storage volume with said received key; and
    upon determining that said secure storage volume is unlocked using an interrupt, transfer said received data from said buffer to said secure storage volume in encrypted form.

* * * * *